Patented June 7, 1949

2,472,470

UNITED STATES PATENT OFFICE 2,472,470

PROCESS FOR THE PREPARATION OF MERCAPTANS

Lawrence T. Eby, Roselle, N. J., assignor to Standard Oil Development Company, a corporation of Delaware No Drawing. Application August 4, 1945, Serial No. 609,040

10 Claims. (Cl. 260—609)

This invention relates to a method of preparing mercaptans by the reaction of hydrogen sulfide with an organic halide in the presence of a Friedel-Crafts type catalyst.

It is an object of this invention to provide the art with an improved method of reacting an organic halide with hydrogen sulfide by catalyzing the reaction with a Friedel-Crafts type catalyst.

It is another object of this invention to catalyze the reaction between an organic halide and hydrogen sulfide with a chemical agent which acts according to what is known in the art as a true catalyst.

It is another and further object of this invention to prepare mercaptans by an efficient and economical method.

These and other objects appear more clearly from the detailed description and claims which follow.

Heretofore, mercaptans have been made from the reaction of an organic halide with hydrogen sulfide by the use of an alkaline reagent. This alkaline reagent acted to form a hydrogen sulfide salt which, in turn, reacted with the organic halide; it was therefore necessary to use stoichiometric quantities of caustic in order to complete the reaction. The alkaline reagent did not act as a true catalyst. There has been a large consumption of caustic in the production of mercaptans as made by the methods practiced heretofore.

It has now been discovered that mercaptans can be prepared by reacting an organic halide with hydrogen sulfide in the presence of a catalyst selected from the class known in the art as Friedel-Crafts type catalyst, such as boron trifluoride, hydrogen fluoride, stannic chloride, aluminum chloride, titanium chloride, ferric chloride, etc. These Friedel-Crafts type catalysts behave in the reaction between organic halides and hydrogen sulfide as true catalysts.

The following equation probably represents the reaction taking place between an organic halide and hydrogen sulfide:

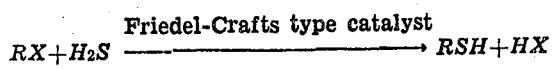

In the above equation R represents an organic group such as alkyl, aryl, alkaryl and aralkyl; X represents a halogen atom.

The following examples illustrate some applications of the invention but it is not intended that the invention be restricted by or to the examples.

*Example 1*

Hydrogen sulfide was bubbled into a solution of 74.3 grams of tertiary octyl chloride, prepared from diisobutylene and hydrogen chloride, and 4 cc. of anhydrous stannic chloride contained in a 200 cc. flask. The reaction was made at room temperature and an excess of hydrogen sulfide was added. There was no precipitate formed on addition of the hydrogen sulfide. After the addition of hydrogen sulfide was stopped, dilute sodium carbonate solution in slight excess of that required to neutralize the hydrogen chloride formed by the reaction was added and a precipitate was formed. The sodium carbonate solution used was made by adding 25 cc. of 25% aqueous sodium carbonate to 100 cc. of water. The hydrogen sulfide was bubbled into the above solution at a rate of 5 to 10 cc. per second for 1½ hours; there is only a very slight evolution of hydrogen chloride at the end of the 1½ hour period. The neutralized reaction mixture was steam-distilled to obtain tertiary octyl mercaptan.

*Example 2*

Hydrogen sulfide at the rate of 10½ cc. per second was bubbled for a period of one hour into a mixture of 92.7 grams of tertiary butyl chloride and 3 cc. of anhydrous stannic chloride contained in a one liter flask equipped with a stirrer and a reflux condenser. The reaction mixture was stirred throughout the addition of the hydrogen sulfide and stirring was continued for 15 minutes after the hydrogen sulfide addition was completed. 200 cc. of dilute aqueous sodium carbonate was added with stirring to the reaction mixture, followed by a steam distillation of the solution. Tertiary butyl mercaptan was obtained in the distillate.

*Example 3*

A mixture of hydrogen sulfide and boron trifluoride containing 1% of the latter was passed into 149 grams of tertiary butyl chloride contained in a one liter flask equipped with a stirrer and a reflux container over a period of 1½ hours. This constitutes an excess of hydrogen sulfide. Vigorous stirring was employed during the addition of the gaseous mixture and stirring was continued for 15 minutes after addition of gases was ended. The reaction mixture was washed with water and neutralized with aqueous sodium bicarbonate and then dried over anhydrous potassium carbonate. The organic material was fractionally distilled to obtain tertiary butyl mercaptan.

The temperature at which the reaction is made depends upon the organic halide used as well as upon the catalyst chosen and may vary widely, but the ordinary practice is to make the reaction at room temperature.

A large number of organic halides not included in the examples set out above may be employed in this invention. The organic halides may be of the alkyl, aryl, alkaryl and aralkyl types and the alkyl and aralkyl types may be primary, secondary or tertiary in nature. Other substituents may be present in the organic halides provided they are not affected by the catalyst. Such things as are affected by the catalyst would include esters and ketones.

Some examples of organic halides which may be employed in this invention are listed below, but the scope of the invention is not intended to be limited thereby:

Benzyl chloride
    Parachlorbenzyl chloride
    Bromobenzene
    Iodobenzene
    Tertiary butyl chloride
    Isopropyl chloride
    Butyl chloride
    Octyl chloride
    Amyl chloride
    Dodecyl bromide
    Dodecyl chloride In the preferred form of the invention primary, secondary and tertiary alkyl halides are employed to obtain the corresponding mercaptans.

The mercaptans have a variety of uses, among which are their uses as promoters and modifiers in emulsion polymerization for the preparation of synthetic rubbers. The mercaptans have a wide and recognized value in the art for the making of a variety of derivatives through the reaction of various organic and inorganic substances with the reactive —SH group in the mercaptan molecule.

The mercaptans described can be made according to the invention by a continuous process by mixing a gaseous catalyst such as $BF_3$ or HF with the $H_2S$ and contacting the mixture of gases with the halide. The mercaptan as it is formed is continuously removed. When a solid catalyst such as $AlCl_3$ is used it is mixed with the liquid halide and $H_2S$ is contacted with the mixture. The mercaptan as it is formed is continuously removed.

The mercaptan can be concentrated or purified from crude reaction mixtures by distillation or extraction with an alkaline agent or by extraction with an alkaline agent by neutralization and distillation.

What is claimed is:

1. A process for making mercaptans which comprises reacting a tertiary alkyl halide with hydrogen sulfide at room temperature in the presence of a Friedel-Crafts type catalyst.

2. A process for making tertiary butyl mercaptan which comprises reacting tertiary butyl chloride with hydrogen sulfide at room temperature in the presence of a Friedel-Crafts type catalyst.

3. A process for making diisobutyl mercaptane which comprises reacting tertiary octyl chloride with hydrogen sulfide at room temperature in the presence of a Friedel-Crafts type catalyst.

4. A process of making mercaptans having the general formula, RSH, wherein R represents a hydrocarbon group containing an alkyl radical which comprises reacting hydrogen sulfide at room temperature in the presence of a Friedel-Crafts type catalyst with an organic halide of the formula, $R_1X$, where $R_1$ represents an alkyl radical and X represents a halogen atom.

5. Process according to claim 4 in which the Friedel-Crafts type catalyst is boron fluoride.

6. Process according to claim 4 in which the Friedel-Crafts type catalyst is hydrogen fluoride.

7. Process according to claim 4 in which the Friedel-Crafts type catalyst is tin tetrachloride.

8. Process according to claim 4 in which a primary carbon atom in the hydrocarbon $R_1$ group of the organic halide is bonded to the halogen atom.

9. Process according to claim 4 in which a tertiary carbon atom in the hydrocarbon $R_1$ group of the organic halide is bonded to the halogen atom.

10. Process for making a mercaptan which comprise reacting hydrogen sulfide with an alkyl chloride at room temperature in the presence of a Friedel-Crafts type catalyst.

LAWRENCE T. EBY.

REFERENCES CITED

The following references are of record in the file of this patent:

UNITED STATES PATENTS

| Number | Name | Date |
|---|---|---|
| 2,065,323 | Thomas | Dec. 22, 1936 |
| 2,181,642 | McMillan | Nov. 28, 1939 |
| 2,366,453 | Meadow | Jan. 2, 1945 |
| 2,368,446 | Buc | Jan. 30, 1945 |

FOREIGN PATENTS

| Number | Country | Date |
|---|---|---|
| 454,668 | Great Britain | Oct. 6, 1936 |

OTHER REFERENCES

Arndt, "Berichte," vol. 63, pages 2390-2393.